3,465,022
Patented Sept. 2, 1969

3,465,022
[(2,2-DIACYLVINYL)ARYLOXY(AND ARYLTHIO)] ALKANOIC ACID DERIVATIVES
Edward J. Cragoe, Jr., and John B. Bicking, Lansdale, Pa., assignors to Merck & Co., Inc., Rahway, N.J., a corporation of New Jersey
No Drawing. Filed Aug. 20, 1965, Ser No. 482,040
Int. Cl. C07c 69/66, 103/30; A61k 27/00
U.S. Cl. 260—453                                                       29 Claims

ABSTRACT OF THE DISCLOSURE

[(2,2 - diacylvinyl)phenoxy- and phenylthio]alkanoic acid products and salts, esters and amide derivatives thereof, wherein the acyl moiety in the diacylvinyl substituents may be an alkanoyl, aroyl or aralkanoyl radical and the benzene ring may be substituted by from one to four halo, trihalomethyl, alkyl, alkoxy, nitro or alkanamido substituents or by a divalent hydrocarbylene chain. The said products are diuretic and saluretic agents which are useful in the treatment of hypertension.

The products may be prepared by three routes: (1) via the condensation of a nuclear formyl substituted phenoxy (or phenylthio)alkanoic acid with a diketone; (2) via the etherification of a 2-(hydroxy(or mercapto)benzylidene) 1,3-diketone; or (3) via the hydrolysis of a [(2,2-diacylvinyl)phenoxy(or phenlythio)]alkanoic acid ester.

This invention relates to a new class of chemical compounds which can be described generally as [(2,2-diacylvinyl)aryloxy(and arylthio)]alkanoic acids and to the nontoxic, pharmacologically acceptable salts, esters and amide derivatives thereof.

Also, it is an object of this invention to describe novel methods of preparation for the foregoing [(2,2-diacylvinyl)aryloxy(and arylthio)]alkanoic acids, esters and amide derivatives.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The [(2,2-diacylvinyl)aryloxy(and arylthio)]alkanoic acids of the invention are compounds having the following structural formula:

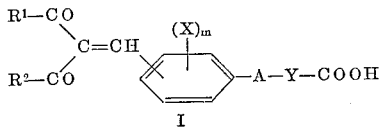

I wherein A is a member selected from the group consisting of oxygen and sulfur; $R^1$ and $R^2$ are similar or dissimilar members selected from the group consisting of alkyl, for example, lower alkyl such as methyl, ethyl, propyl, isopropyl, butyl, pentyl, etc.; aryl, for example, mononuclear aryl such as a phenyl radical which may be unsubstituted or substituted by one or more similar or dissimilar substituents selected from the group consisting of halogen, lower alkyl and lower alkoxy; and aralkyl, for example, mononuclear aralkyl such as benzyl, phenethyl, etc. which may be unsubstituted or substituted by one or more similar or dissimilar substituents selected from the group consisting of halogen, lower alkyl and lower alkoxy; the X radicals are similar or dissimilar members selected from the group consisting of hydrogen; halogen, including haloalkyl, for example, a trihalomethyl radical such as trifluoromethyl, etc.; alkyl, for example, lower alkyl; alkoxy, for example, lower alkoxy; nitro; alkanamido, for example, lower alkanamido such as acetamido; and, taken together, two X radicals on adjacent carbon atoms of the benzene ring may be joined together to form an hydrocarbylene chain (i.e., a divalent organic radical composed solely of carbon and hydrogen) containing from three to four carbon atoms between their points of attachment, for example, trimethylene, tetramethylene, 1,3-butadienylene (i.e., $$-CH=CH-CH=CH-)$$

etc.; Y is a member selected from the group consisting of alkylene and haloalkylene having a maximum of six carbon atoms and which contain from one to three linear carbon atoms between the carboxy and oxygen (or sulfur) moieties; alkylene and haloalkylene radicals representative of the radical Y include, for example, methylene, ethylene, ethylidene, trimethylene, propylidene, isopropylidene, fluoromethylene, etc. and $m$ is an integer having a value of one to four.

A preferred embodiment of the invention relates to the [(2,2-diacylvinyl)phenoxy]alkanoic acids having the following structural formula:

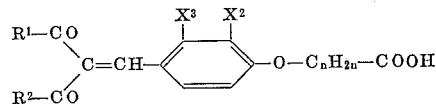

wherein $R^1$ and $R^2$ are similar or dissimilar lower alkyl radicals; $X^2$ and $X^3$ represent similar or dissimilar members selected from the group consisting of hydrogen, halogen, lower alkyl and, taken together, may be joined to form a 1,3-butadienylene linkage (i.e., $$-CH=CH-CH=CH-)$$

and $n$ is an integer having a value of one to three. The foregoing class of compounds exhibits particularly good diuretic and saluretic activity and represents a preferred subgroup of compounds within the scope of this invention.

The [(2,2-diacylvinyl)aryloxy(and arylthio)]alkanoic acids (I) of the invention are conveniently prepared by one or more of three alternate processes, the first of which involves the condensation of a formyl substituted aryloxy (or arylthio)alkanoic acid with a diketone; the second of which involves the etherification of a 2-(hydroxy(or mercapto)benzylidene)-1,3-diketone; and the third of which involves the hydrolysis of a [(2,2-diacylvinyl)aryloxy(or arylthio)]alkanoic acid ester.

The first of the aforementioned processes, that is, the condensation process, relates specifically to the reaction of a formyl substituted aryloxy(or arylthio)alkanoic acid (II, infra) with a diacylmethane. This reaction is advantageously conducted in the presence of a catalyst such as an amine salt of a carboxylic acid, for example, in the presence of piperidine acetate, etc. Also, a water immiscible solvent system in which the reactants and products are reasonably soluble should be employed; typical solvents include, for example, benzene, toluene, xylene or mixtures of the foregoing with acetic acid, dimethylformamide, etc. Also, it is advantageous to remove the water that is formed during the reaction as, for example, by the use of chemical dehydrating agents, molecular sieves, azeotropic distillation, etc. The reaction may be carried out at ambient temperature but it is most desirable to conduct the reaction at elevated temperatures as, for exexample, at the reflux temperature of the solvent system. The following equation illustrates the reaction:

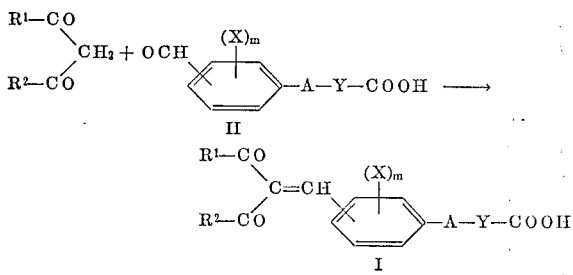

wherein A, $R^1$, $R^2$, X, Y and $m$ are as defined above.

The second principal method by which the products of the invention may be prepared relates to the reaction of a 2-(hydroxy(or mercapto)benzylidene)-1,3-diketone (III, infra) with a suitable etherification reagent in the presence of a base followed by the conversion of the [(2,2-diacylvinyl)aryloxy(or arylthio)]alkanoic acid salt (IV, infra) thus formed to the corresponding free acid by acidification of the reaction mixture. Suitable bases which may be used in the process include, for example, an alkali metal carbonate such as potassium carbonate, an alkali metal alkoxide such as sodium methoxide, potassium methoxide, sodium ethoxide, etc. This method of preparation is suitable for obtaining those [(2,2-diacylvinyl)aryloxy(or arylthio)]alkanoic acid products (Ia, infra) which contain an alkylene chain having a single carbon atom or three carbon atoms between the carboxy and oxygen (or sulfur) moieties since the etherification reagent employed is an haloalkanoic acid having the formula: $X^1—Y^1—COOM$ wherein $X^1$ is halogen, for example, chlorine, bromine, iodine, etc. and $Y^1$ is a methylene or trimethylene radical which may be appropriately substituted by alkyl or halogen radicals such as a monofluoro group and M is hydrogen or the cation derived from an alkali metal hydroxide, an alkali metal carbonate, etc. such as a sodium or potassium cation. The following equation wherein the etherification reagent employed is an haloalkanoic acid and the basic reagent is potassium carbonate illustrates this method of preparation; however, it is to be understood that the alkali metal salts of the haloalkanoic acid reactant may also be employed in an otherwise similar process and that other basic reagents such as sodium carbonate or alkali metal alkoxides may also be employed:

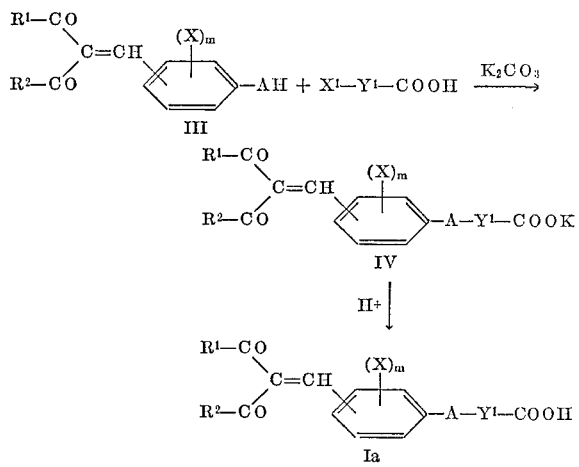

wherein A, $R^1$, $R^2$, X, $X^1$, $Y^1$ and $m$ are as defined above and $H^+$ is the cation derived from an organic or inorganic acid such as hydrochloric acid, etc. The choice of a suitable reaction solvent is dependent largely upon the character of the reactants and, in general, any solvent which is substantially inert to the reactant employed and in which the reagents are reasonably soluble may be used; however, ethanol and acetone are particularly advantageous solvents in which to conduct the process. Also, the reaction may be carried out at ambient temperatures but, generally, it is desirable to conduct the reaction at temperatures slightly above ambient temperature.

Those [(2,2-diacylvinyl)aryloxy(or arylthio)]alkanoic acids which contain two linear carbon atoms in the alkylene chain between the carboxy and oxygen (or sulfur) moieties are also obtained by the etherification of a 2-(hydroxy(or mercapto)benzylidene)-1,3-diketone (III, infra) but, in lieu of employing the metal salt of an haloalkanoic acid as described in the preceding process, a propiolactone, or an appropriately substituted derivative thereof, is used. The reaction of the 2-(hydroxy(or mercapto)benzylidene)-1,3-diketone with the lactone is conducted in the presence of a base such as an aqueous solution of sodium hydroxide and, preferably, with heating at reflux temperatures. Acidification of the resulting mixture (V, infra) thus obtained then yields the desired product (Ib, infra). The following equation illustrates the reaction:

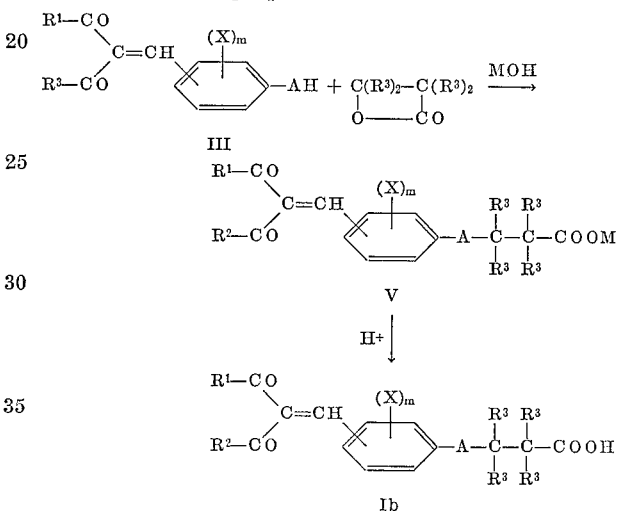

wherein A, M, $R^1$, $R^2$, X, $m$ and $H^+$ are as defined above and the $R^3$ radicals are similar or dissimilar substituents selected from the group consisting of hydrogen and lower alkyl.

The third principal method for preparing the products of the invention consists in the hydrolysis of an ester of an appropriate [(2,2-diacylvinyl)aryloxy(or arylthio)]alkanoic acid (VI, infra). The hydrolysis is conducted in the conventional manner by treatment of the said ester (VI) with an aqueous solution of an acid, for example, with an aqueous solution of hydrochloric acid, in which instance a solvent such as acetic acid can be used or, alternatively, the hydrolysis may be conducted with an aqueous solution of a base such as an aqueous solution of sodium bicarbonate, in which instance the use of a solvent such as a lower alkanol is advantageous; however, when an aqueous solution of a base is employed it is necessary to treat the carboxylate salt intermediate thus formed with an acid to obtain the desired product. The following equation illustrates this method of preparation:

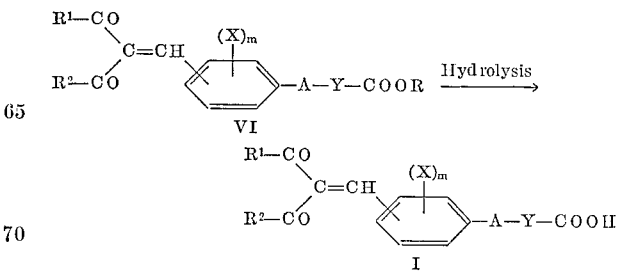

wherein A, $R^1$, $R^2$, X, Y, and $m$ are as defined above and R is an hydrocarbyl radical, i.e., an organic radical composed solely of carbon and hydrogen such as an alkyl radical, etc.

The formyl substituted aryloxy(or arylthio)alkanoic acids (II) which are employed as starting materials in the aforementioned reaction with diacylmethanes are prepared from their appropriate nuclear hydroxy(or mercapto) substituted benzaldehyde precursors (VII, infra) by the reaction of the latter with an appropriate etherification reagent.

When, for example, it is desired to prepare a formyl substituted aryloxy(or arylthio)alkanoic acid (IIa, infra) wherein the alkylene chain in the alkanoic acid moiety has one or three linear carbon atoms in the chain between the carboxy and oxygen (or sulfur) radicals, the etherification reagent is an alkali metal or an alkaline earth metal salt of a suitable haloalkanoic acid having the formula $X^1-Y^1-COOM$ wherein the radicals M, $X^1$ and $Y^1$ are as defined above. In general, the etherification is conducted in the presence of a base such as an aqueous solution of sodium or potassium carbonates or in the presence of the corresponding hydroxides or in the presence of a sodium alcoholate such as sodium ethoxide, and the alkanoic acid salt thus obtained is then converted to the desired formyl substituted aryloxy(or arylthio) alkanoic acid derivative (IIa) in the conventional manner by treatment with an acid such as hydrochloric acid. The following equation illustrates the reaction:

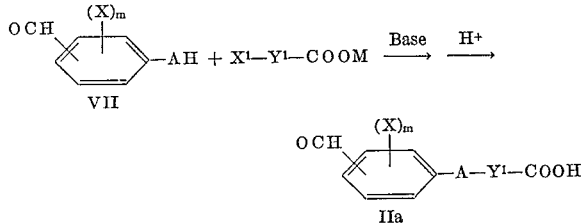

wherein A, M, X, $X^1$, $Y^1$, $m$ and $H^+$ are as defined above. The choice of a suitable reaction solvent for the process is dependent largely upon the character of the reactants employed; however, in general, it can be stated that any solvent which is substantially inert with respect to the reactants employed and in which the reagents are reasonably soluble may be used. Solvents which have proved to be particularly advantageous include ethanol and dimethylformamide. Also, the reaction may be carried out at ambient temperatures but, generally, it is desirable to conduct the reaction at temperatures slightly above ambient temperature.

Those formyl substituted aryloxy(or arylthio)alkanoic acid starting materials (IIb, infra) wherein the alkylene chain contains two linear carbon atoms between the carboxy group and the oxygen(or sulfur) moieties are prepared from their corresponding nuclear hydroxy(or mercapto) substituted benzaldehyles (VII) by the reaction of the latter with propioactone or with an appropriately substituted propioactone, in the presence of a base such as an aqueous solution of sodium hydroxide, preferably, while heating the solution at reflux temperatures; followed by the acidification of the carboxylate intermediate thus formed to obtain the corresponding formyl substituted aryloxy(or arylthio)alkanoic acid (IIb). The following equation illustrates the reaction:

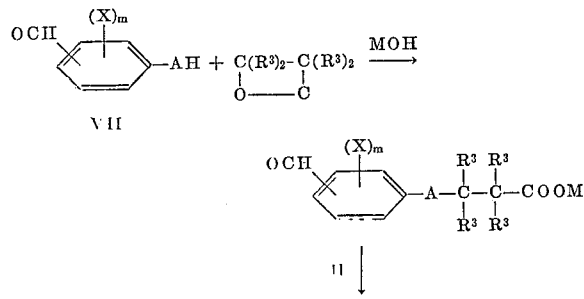

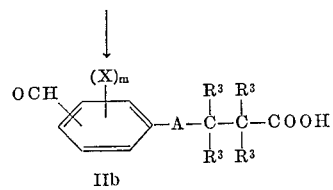

wherein A, M, $R^3$, X, $m$ and $H^+$ are as defined above.

Also, the formyl substituted aryloxy(or arylthio)alkanoic acids (II) can be prepared by the hydrolysis, in an aqueous solution of an acid or a base, of the corresponding formyl substituted aryloxy(or arylthio)alkanoic acid ester (VIII, infra) as shown by the following equation:

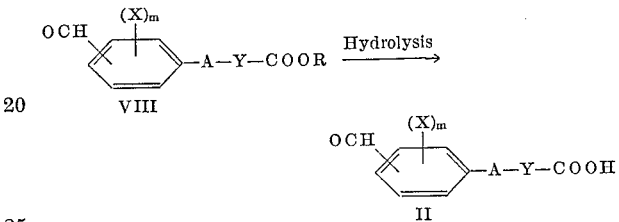

wherein the radicals A, R, X, Y and $m$ are as defined above.

The 2-(hydroxy(or mercapto)benzylidene)-1,3-diketones (III) which are used as starting materials in the second principal method described above for preparing the products of the invention, i.e., the etherification process, are obtained by the reaction of a suitable nuclear hydroxy(or mercapto) substituted benzaldehyde (VII) with a diacylmethane, preferably, in the presence of a catalyst. When the catalyst employed is a base such as an amine, for example, piperidine, or a sodium alcoholate, the reaction is generally carried out in an alcohol solvent such as a lower alkanol or in dimethylformamide and, preferably, at ambient temperatures or at temperatures slightly above ambient temperature. Alternatively, in lieu of employing a base such as an amine or sodium alcoholate in the reaction of the hydroxy(or mercapto) substituted benzaldehyde with diacylmethanes, it is also advantageous to employ such catalysts as amine salts of carboxylic acids, for example, piperidine acetate and too, a water immiscible solvent system in which the reactants and 2-(hydroxy(or mercapto)benzylidene)-1,3-diketone compounds (III) are reasonably soluble. Typical solvents include benzene, toluene and xylene or mixtures of the foregoing with acetic acid, dimethylformamide, etc. Also, it has been found advantageous to remove the water that is formed during the reaction as, for example, by the use of chemical dehydrating agents, molecular sieves or by azeotropic distillation. The reaction may be carried out at ambient temperatures but, generally, it is most advantageous to conduct the reaction at elevated temperatures as, for example, at the reflux temperature of the solvent system. The following equation illustrates the process:

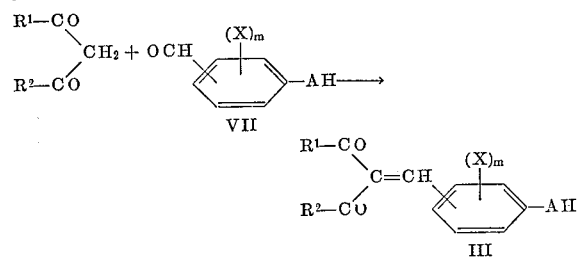

wherein A, $R^1$, $R^2$, X and $m$ are as defined above.

The [(2,2-diacylvinyl)aryloxy(or arylthio)]alkanoic acid esters (VI) which have been described above in connection with the third principal method for preparing the products of the invention are useful not only as chemical intermediates but are themselves active as diuretics.

The said esters may be prepared by one or more of three methods: (a) by the etherification of a 2-(hydroxy(or mercapto)benzylidene)-1,3-diketone (III) through reaction of the said diketone with a suitable haloalkanoic acid ester; (b) by the condensation of a formyl substituted aryloxy(or arylthio)alkanoic acid ester with a diacylmethane and (c) by the esterification of a [(2,2-diacylvinyl)aryloxy(or arylthio)]alkanoic acid (I) according to known methods. The said etherification, condensation and esterification methods are discussed further below.

The etherification process (a) for preparing the said ester derivatives relates specifically to the reaction of a 2 - (hydroxy(or mercapto)benzylidene) - 1,3 - diketone (III) with an appropriate haloalkanoic acid ester having the formula $X^1\text{—}Y^1\text{—}COOR$ wherein the radicals R, $X^1$ and $Y^1$ are as defined hereinabove. It will be noted that inasmuch as the definition of the $Y^1$ radical is limited solely to methylene or trimethylene, which may be substituted by alkyl or fluorine, the [(2,2-diacylvinyl)aryloxy(or arylthio)]alkanoic acid esters produced by the process contain only a single carbon atom or, alternatively, three linear carbon atoms between the carboxy and oxygen(or sulfur) moieties of the ester derivative (VIa). The following equation illustrates the reaction:

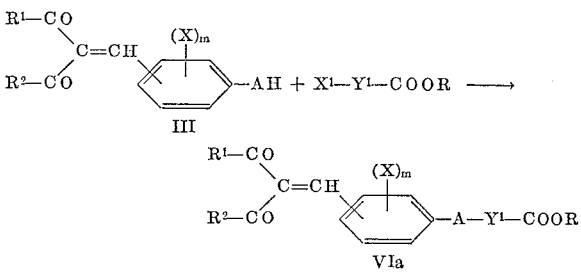

wherein the radicals A, R, $R^1$, $R^2$, X, $X^1$, $Y^1$ and $m$ are as defined above. In general, the reaction is conducted in the presence of a base such as sodium or potassium carbonate or sodium or potassium hydroxide or in the presence of a sodium alcoholate, such as sodium ethoxide. The choice of a suitable reaction solvent is dependent largely upon the character of the reactants employed but, in general, any solvent which is substantially inert to the reactants and in which the reagents are reasonably soluble may be used. For example, ethanol and dimethylformamide have proved to be particularly advantageous solvents in which to conduct the reaction. The process may be carried out at ambient temperatures but, generally, it is desirable to conduct the process at temperatures above ambient temperature.

The condensation process (b) for preparing the ester derivatives (VI) involves the reaction of a formyl substituted aryloxy(or arylthio)alkanoic acid ester (VIII) with a diacylmethane in the presence of a catalyst. When the catalyst employed is a base such as an amine, for example, piperidine or a sodium alcoholate, the reaction is usually carried out in an alcohol solvent such as a lower alkanol or in dimethylformamide and, preferably, at ambient temperatures or at temperatures slightly above ambient temperature. However, when such catalysts as amine salts of carboxylic acids, for example, piperidine acetate, etc., are employed, a water immiscible solvent system is used in which the reactants and products are reasonably soluble and the water formed during the reaction is removed in a conventional manner as, for example, by the use of chemical dehydrating agents, molecular sieves or azeotropic distillation. Typical solvents which may be used include benzene, toluene and xylene or mixtures thereof with acetic acid, dimethylformamide, etc. Also, the reaction may be carried out at ambient temperatures but, generally, it is most advantageous to conduct the reaction at elevated temperatures, for example, at the reflux temperature of the solvent system. The following equation illustrates the reaction:

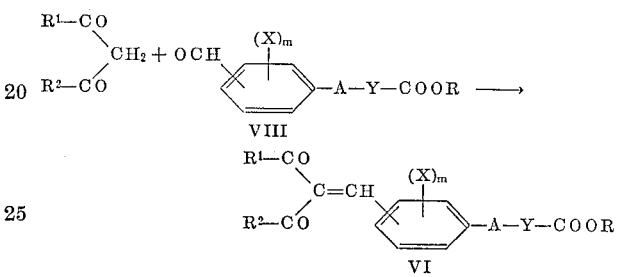

wherein A, R, $R^1$, $R^2$, X, Y and $m$ are as defined above.

The esterification method (c) for the preparation of the [(2,2-diacylvinyl)aryloxy(or arylthio)]alkanoic acid esters (VI) is effected by either of two alternate routes. The said ester derivatives (VI) may be prepared either by the reaction of a [(2,2 - diacylvinyl)aryloxy(or arylthio)]alkanoic acid (I) with the appropriate lower alkanol, preferably, in the presence of a catalyst such as an acid, for example, sulfuric acid to obtain the corresponding esterified product (VI) or, alternatively, the [(2,2-diacylvinyl)aryloxy(or arylithio)]alkanoic acid (I) may be converted to the corresponding acid halide by the reaction of the said acid with an appropriate halogenating agent such as thionyl chloride and then treating the said acid halide with an appropriate alcohol as, for example, with a lower alkanol or with dialkylamino substituted lower alkanol such as 2-diethylaminoethanol, to prepare the corresponding esterified product. The following equations illustrate the reaction:

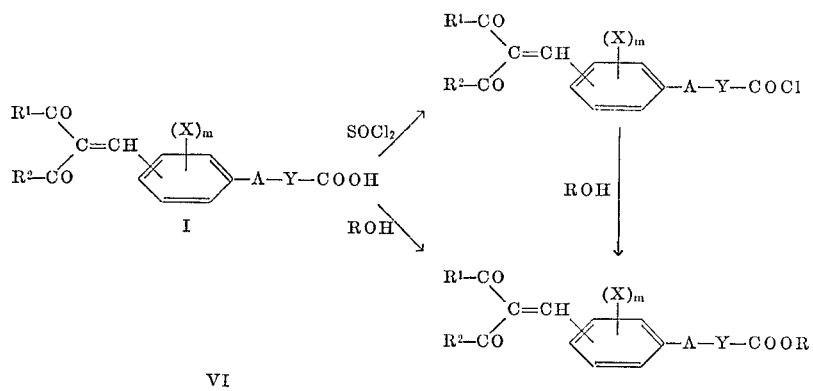

wherein A, R, $R^1$, $R^2$, X, Y and $m$ are as defined above.

The formyl substituted aryloxy(or arylthio)alkanoic acid esters (VIII) which are employed as intermediates in the preparation of the [(2,2-diacylvinyl)aryloxy(or arylthio)]alkanoic acid esters (VI, supra) are prepared by one of three methods: (a) by the etherification of an appropriate nuclear hydroxy(or mercapto) substituted benzaldehyde (VII); (b) by the esterification of a formyl substituted aryloxy(or arylthio)alkanoic acid (II); or (c) by the formylation of an aryloxy(or arylthio)alkanoic acid ester (IX, infra).

The etherification process (a) for the preparation of the formyl substituted aryloxy(or arylthio)alkanoic acid esters is conducted in a manner similar to that described above for the etherification of the 2-(hydroxy(or mercapto)benzylidene)-1,3-diketones (III) by the reaction thereof with an appropriate haloalkanoic acid ester. According to this method a nuclear substituted hydroxy(or mercapto)benzaldehyde (VII) is treated with an haloalkanoic acid ester in which the alkylene radical joining the halogen and carboxy groups is a methylene or trimethylene radical which may be substituted by one or more alkyl radicals or a fluoro group. The following equation illustrates the reaction:

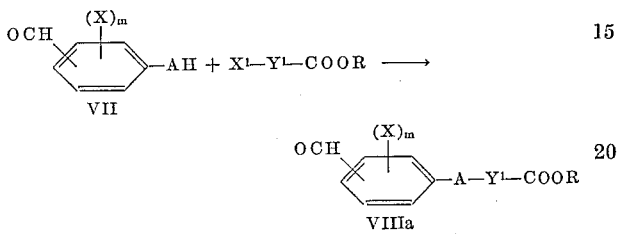

wherein the radicals A, R, X, $X^1$, $Y^1$ and $m$ are as defined above. It will be appreciated that in view of the limitation on the length of the alkylene chain (i.e., the $Y^1$ radical) in the haloalkanoic acid ester reactant, the foregoing etherification reaction is limited to the preparation of formyl substituted aryloxy(or arylthio)acetic and butyric acid esters and derivatives thereof wherein the alkylene chain of the acetic and butyric acid moieties is substituted by an alkyl or a fluoro group. The reaction is conducted in the presence of a base such as sodium or potassium carbonates or the corresponding hydroxides or in the present of sodium alcoholates such as sodium ethoxide. Suitable reaction solvents may be employed but ethanol or dimethylformamide has proved to be a particularly advantageous reaction medium. Also, the reaction may be conducted at ambient temperatures, but generally it is desirable to conduct the reaction at temperatures above ambient temperature.

The esterification process (b) for the preparation of the formyl substituted aryloxy(or arylitho)alkanoic acid esters (VIII) is effected by the reaction of an appropriate formyl substituted aryloxy (or arylthio)alkanoic acid (II) with an appropriate lower alkanol, substituted lower alkanol, etc., to obtain the corresponding esterified product or, alternatively, by the reaction of a formyl substituted aryloxy(or arylthio)alkanoic acid (II) with a suitable halogenating agent to form the corresponding acid halide and then treating the said formyl substituted aryloxy(or arylthio)alkanoic acid halide (X) thus formed with a lower alkanol or with a substituted lower alkanol to prepare the corresponding esterified product (VIII). The following equation illustrates the reaction:

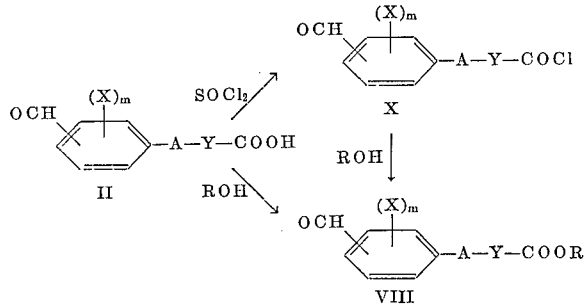

wherein A, R, X, Y and $m$ are as defined above.

The formylation process (c) for preparing the formyl substituted aryloxy(or arylthio)alkanoic acid ester intermediates (VIII) is conducted by treating an appropriate aryloxy(or arylthio)alkanoic acid ester (IX, infra) with formaldehyde and concentrated hydrochloric acid to obtain the corresponding chloromethyl substituted aryloxy (or arylthio)alkanoic acid ester (XI) and the chloromethyl derivative thus obtained is then treated with hexamethylenetetramine and concentrated hydrochloric acid under reflux to obtain the desired formyl substituted compound (VIII). The following equation illustrates the process:

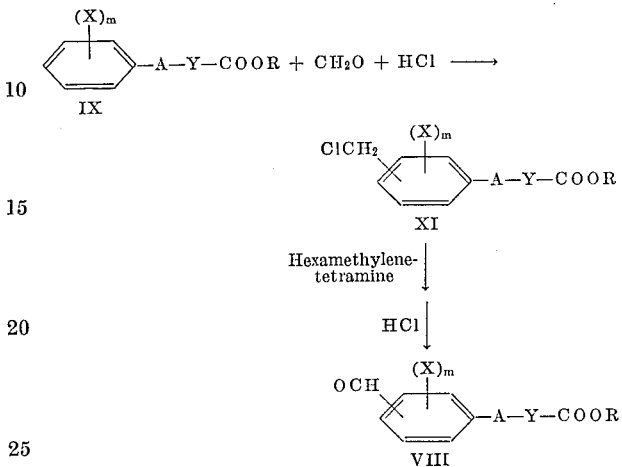

wherein A, R, Y, X and $m$ are as defined above.

The nuclear hydroxy(and mercapto) substituted benzaldehyde intermediates (VII) are either known compounds or may be prepared by methods which are known to those skilled in the art. Thus, for example, by treating a phenol or an appropriate nuclear substituted derivative thereof with chloroform in the presence of an aqueous solution of a base and then treating the resulting mixture with an acid such as hydrochloric acid, the corresponding nuclear hydroxy substituted benzaldehyde is obtained. Alternatively, the said hydroxy substituted benzaldehyde intermediates may also be obtained by the reaction of a phenol, or an appropriate nuclear substituted derivative thereof, with hydrogen cyanide and hydrogen chloride (gas) in the presence of anhydrous aluminum chloride. This reaction is preferably conducted in an inert solvent as, for example, in a benzene solution. The following equation illustrates these methods of preparation:

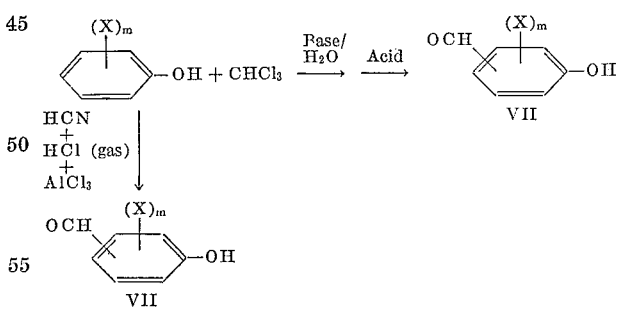

wherein X and $m$ are as defined above.

The [(2,2-diacylvinyl)aryloxy(and arylthio)]alkanoic acid products (I) of the invention are generally obtained as crystalline solids and, if desired, may be purified by recrystallization from a suitable solvent. Suitable solvents include, for example, ethyl acetate, iospropyl alcohol, nitromethane, acetic acid, acetonitrile, etc. or mixtures of solvents, such as a mixture of ethyl acetate and hexane or a mixture of butanone and hexane, etc.

Included within the scope of this invention are the nontoxic, pharmacologically acceptable acid addition salts of the instant products (I). In general, any base which will form an acid addition salt with the foregoing [(2,2-diacylvinyl)aryloxy(and arylthio)]alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

Also included within the scope of this invention are the amide derivatives of the [(2,2-diacylvinyl)aryloxy(or arylthio)]alkanoic acids (I) which may be prepared by several methods. According to one method the amide derivatives may be prepared by converting a [(2,2-diacylvinyl) aryloxy(or arylthio)]alkanoic acid to the corresponding acid halide in a conventional manner and treating the said acid halide with ammonia or an appropriate amine to obtain the desired amide. Another method of preparation consists in the reaction of a [(2,2-diacylvinyl)aryloxy (or arylthio)]alkanoic acid (I) with a special reagent such such as dicyclohexylcarbodiimide, N - ethyl - 5 - phenylisoxazolium-3'-sulfonate, 1,1'-carbonyldiimidazole, 1,1'-thionyldiimidazole, etc. and treating the intermediate thus formed with ammonia or a suitable amine to form the corresponding amide product. Still another process for preparing the amide derivatives of the instant products (I) comprises the etherification of a 2-(hydroxy(or mercapto) benzylidene)-1,3-diketone (III) with an haloalkanoic acid amide of the formula: $X^1—Y^1—CONR^4R^5$ wherein $X^1$ and $Y^1$ are as defined above and the radicals $R^4$ and $R^5$ are selected from the group consisting of hydrogen, alkyl, hydroxyalkyl, haloalkyl, aralkyl, alkoxyalkyl and dialkylaminoalkyl. These and other equivalent methods for the preparation of the amide derivatives of the instant products (I) will be apparent to those having ordinary skill in the art and to the extent that the said derivatives are both nontoxic and physiologically acceptable to the body system, the said amides are the functional equivalent of the corresponding [(2,2-diacylvinyl)aryloxy(and arylthio)] alkanoic acid products (I).

The examples which follow illustrate the [(2,2-diacylvinyl)aryloxy(and arylthio)]alkanoic acids (I) of the invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1.—[2,3-DICHLORO-4-(2,2-DIACETYLVINYL)PHENOXY]ACETIC ACID

Step A: 2,3-dichloro-4-hydroxybenzaldehyde

In a 5 liter, three-necked flask, equipped with a mechanical stirrer, condenser, thermometer and dropping funnel, is placed water (2000 ml.), calcium hydroxide (280 g., 3.78 moles), sodium carbonate (320 g., 3.02 moles) and 2,3-dichlorophenol (142.6 g., 0.875 mole). The resulting suspension is heated on a steam bath to 65° C. and to it is added chloroform (208 g., 1.75 moles), dropwise, with stirring, while maintaining the temperature at 60–70° C. After addition is complete, the mixture is stirred and heated at 60–70° C. for one hour.

The reaction mixture is chilled in an ice bath and acidified with concentrated hydrochloric acid. The mixture is extracted with ethyl acetate (approximately 3 liters) and the extract is dried over magnesium sulfate. The solvent is removed by distillation under reduced pressure and the solid residue is recrystallized from toluene to obtain 37.8 g. (23%) of 2,3-dichloro-4-hydroxybenzaldehyde, M.P. 177–182° C. Two additional recrystallizations from acetonitrile give 2,3-dichloro-4-hydroxybenzaldehyde in the form of white prisms having a melting point of 184–185° C.

*Analysis.*—Calculated for $C_7H_4Cl_2O_2$: C, 44.01; H, 2.11; Cl, 37.12. Found: C, 44.22; H, 2.30; Cl, 37.02.

Step B: Ethyl (2,3-dichloro-4-formylphenoxy)acetate

A mixture of 2,3-dichloro-4-hydroxybenzaldehyde (708 g., 0.37 mole), potassium carbonate (112 g., 0.81 mole), ethyl bromoacetate (135 g., 0.81 mole) and dimethylformamide (285 ml.) is stirred and heated at 55–60° C. for 1.5 hours. The reaction mixture then is cooled in an ice bath and water (300 ml.) is added. The crystalline product which separates is colected on a filter and washed with water. Recrystallization from cyclohexane gives 97 g. (94.5%) of ethyl (2,3-dichloro-4-formylphenoxy) acetate, M.P. 89.5–91.5° C. After two more recrystallizations from cyclohexane the ethyl (2,3-dichloro-4-formylphenoxy)acetate, M.P. 89.5–91.5° C. After two more recrystallizations from cyclohexane the ethyl (2,3-dichloro-4-formylphenoxy)acetate melts at 92–93° C.

*Analysis.*—Calculated for $C_{11}H_{10}Cl_2O_4$: C, 47.68; H, 3.64; Cl, 25.59; Found: C, 47.67; H, 3.58; Cl, 25.40.

Step C(a): Ethyl [2,3-dichloro-4-(2,2-diacetylvinyl)-phenoxy]acetate

A mixture of ethyl (2,3-dichloro-4-formylphenoxy)-acetate (41.6 g., 0.15 mole), acetylacetone (16.5 g., 0.165 mole), ethanol (200 ml.) and piperidine (3 ml.) is warmed at 45° C. for 25 minutes to obtain a clear solution. The solution is allowed to stand at room temperature for 22 hours and then is chilled. The crystals which separate are removed by filtration to yield 48.5 g. (90%) of ethyl [2,3-dichloro-4-(2,2-diacetylvinyl)phenoxy]acetate, M.P. 118–123° C. This material is used in Step D without purification.

Ethyl [2,3-dichloro-4-(2,2-diacetylvinyl)phenoxy]acetate which is recrystallized from a mixture of cyclohexane and ethanol melts at 123–125° C.

*Analysis.*—Calculated for $C_{16}H_{16}Cl_2O_5$: C, 53.50; H, 4.49; Found: C, 53.48; H, 4.61.

Step C(b): Ethyl [2,3-dichloro-4-(2,2-diacetylvinyl) phenoxy]acetate

An alternate route for preparing ethyl [2,3-dichloro-4-(2,2-diacetylvinyl)phenoxy]acetate consists in placing acetylacetone (3 g., 0.03 mole) in a 100 ml. round-bottom flask fitted with a nitrogen inlet tube and Dean-Stark column for the efficient removal of water and then ethyl (2,3-dichloro-4-formylphenoxy)acetate (2.77 g., 0.01 mole), piperidine acetate (100 mg.) and toluene (30 ml.) are added. The solution is refluxed for two hours. The toluene is removed by distillation at reduced pressure and the residual oil is triturated with ethanol (10 ml.) to give 2.9 g. (81%) of ethyl [2,3-dichloro-4-(2,2-diacetylvinyl)phenoxy]acetate. Recrystallization from a mixture of cyclohexane and ethanol yields purified ethyl [2,3-dichloro - 4 - (2,2-diacetylvinyl)phenoxy]acetate which melts at 123–125° C.

Step D: [2,3-dichloro-4-(2,2-diacetylvinyl) phenoxy]acetic acid

A solution of ethyl [2,3-dichloro-4-(2,2-diacetylvinyl)-phenoxy]acetate (48.5 g., 0.135 mole) in acetic acid (225 ml.) and 5% hydrochloric acid (100 ml.) is heated on a steam bath for 40 minutes then cooled and diluted with water (300 ml.). The crystalline product is separated by filtration and dissolved in a dilute sodium bicarbonate solution. A small amount of insoluble material is removed by filtration and the filtrate made acid to Congo red paper by the addition of hydrochloric acid. The resulting precipitate is separated by filtration, dried and recrystallized from ethyl acetate to obtain 32.0 g. (70%) of [2,3-dichloro-4-(2,2-diacetylvinyl)-phenoxy]acetic acid, M.P. 184.5–186.5° C.

*Analysis.*—Calculated for $C_{14}H_{12}Cl_2O_5$: C, 50.77; H, 3.65; Cl, 21.41; Found: C, 50.78; H, 3.77; Cl, 21.27.

In a manner similar to that described in Example 1 for the preparation of [2,3-dichloro-4-(2,2-diacetylvinyl)-phenoxy]acetic acid, the products [2-methyl-3-chloro-4-(2,2-diacetylvinyl)phenoxy]acetic acid and [2-chloro-3- methyl-4-(2,2-diacetylvinyl)phenoxy]acetic acid, respectively, are prepared by substituting 2-methyl-3-chlorophenol and 2-chloro-3-methylphenol for the 2,3-dichlorophenol recited in Step A and following substantially the procedure described in Steps A, B, C(a) and D of that example.

EXAMPLE 2.—[2,3-DICHLORO-4-(2,2-DIACETYL-VINYL)PHENOXY]ACETIC ACID

Step A: (2,3-dichloro-4-formylphenoxy)acetic acid

A solution of ethyl (2,3-dichloro-4-formylphenoxy)-acetate (50 g., 0.151 mole), obtained as described in Example 1, Step B, and sodium bicarbonate (25.5 g., 0.3 mole) in ethanol (450 ml.) and water (900 ml.) is heated two hours on a steam bath and the solution then is cooled. The sodium salt of the product which precipitates is collected by filtration, dissolved in boiling water (1500 ml.) and the solution acidified with concentrated hydrochloric acid to precipitate 40 g. (94%) of (2,3-dichloro-4-formylphenoxy)acetic acid, M.P. 204–210° C. Recrystallization from acetonitrile gives pure (2,3-dichloro-4-formylphenoxy)acetic acid, M.P. 210–212° C.

*Analysis.*—Calculated for $C_9H_6Cl_2O_4$: C, 43.40; H, 2.43; Cl, 28.47. Found: C, 43.22; H, 2.69; Cl, 28.28.

Step B: [2,3-dichloro-4-(2,2-diacetylvinyl)phenoxy]-acetic acid

A solution of (2,3-dichloro-4-formylphenoxy)acetic acid (7.5 g., 0.03 mole), acetylacetone (5.0 g., 0.05 mole), piperidine (1 ml.), acetic acid (30 ml.) and toluene (125 ml.) is heated for three hours at reflux using a Dean-Stark column for continuous removal of water. The solution then is cooled and treated with water (150 ml.) to cause the product to precipitate. The solid product is collected by filtration and recrystallized from ethyl acetate to obtain [2,3-dichloro-4-(2,2-diacetylvinyl) - phenoxy] acetic acid in 34% yield, M.P. 184.5–186.5° C.

EXAMPLE 3.—[2,3-DICHLORO-4-(2,2-DIACETYL-VINYL)PHENOXY]ACETIC ACID

Step A: 3-(2,3-dichloro-4-hydroxybenzylidene)-2,4-pentanedione

A solution of 2,3-dichloro-4-hydroxybenzaldehyde (19.1 g., 0.1 mole) (Example 1, Step A), acetylacetone (11 g., 0.11 mole) and piperidine (3 ml.) in ethanol (75 ml.) is allowed to stand for 25 hours at room temperature. The solution then is diluted with water (75 ml.) and neutralized with concentrated hydrochloric acid. The product which precipitates is recrystallized from a mixture of benzene and ethyl acetate to obtain 12.6 g. (46%) of 3-(2,3-dichloro-4-hydroxybenzylidene) - 2,4 - pentanedione, M.P. 151–153° C.

*Analysis.*—Calculated for $C_{12}H_{10}Cl_2O_3$: C, 52.77; H, 3.69. Found: C, 52.74; H, 3.53.

Step B: Ethyl [2,3-dichloro-4-(2,2-diacetylvinyl)-phenoxy]acetate

A 50 ml. round-bottomed flask is charged with 3-(2,3-dichloro-4-hydroxybenzylidene) - 2,4 - pentanedione (1.36 g., 0.005 mole), dimethylformamide (15 ml.), potassium carbonate (1.38 g., 0.01 mole) and ethyl bromoacetate (1.67 g., 0.01 mole). The reaction mixture is stirred at 60–70° C. for one hour and then poured into ice water (200 ml.). The product which separates (1.6 g., 90% yield) is removed by filtration, washed with water and dried. After recrystallization from a mixture of cyclohexane and ethanol the product melts at 123–125° C.

Step C: [2,3-dichloro-4-(2,2-diacetylvinyl)phenoxy]-acetic acid

By hydrolyzing the ethyl [2,3-dichloro-4-(2,2-diacetylvinyl)phenoxy]acetate of Step B in the manner described in Example 1, Step D, the product [2,3-dichloro-4-(2,2-diacetylvinyl)phenoxy]acetic acid is obtained, M.P. 184.5–186.5° C.

EXAMPLE 4.—[2,3-DIMETHYL-4-(2,2-DIACETYL-VINYL)PHENOXY]ACETIC ACID

Step A: Ethyl (2,3-dimethylphenoxy)acetate

A 500 ml. round-bottom flask is charged with 2,3-dimethylphenol (78 g., 0.64 mole), dimethylformamide (450 ml.), anhydrous potassium carbonate (195 g., 1.4 mole) and ethyl bromoacetate (225 g., 1.34 mole). The stirred reaction mixture is heated at 60–65° C. in a water bath for 45 minutes and then poured into 1.5 liters of ice water. The product is extracted with ether (500 ml.), washed with three 500 ml. portions of water and dried over magnesium sulfate. The ether is distilled at reduced pressure and the product fractionated to give 86 g. (65%) of ethyl (2,3-dimethylphenoxy)acetate, B.P. 153–155° C./15 mm. The product is used in the next step without further purification.

Step B: Ethyl [2,3-dimethyl-4-(chloromethyl)phenoxy]-acetate

A 250 ml. round-bottom flask fitted with a stirrer, condenser and gas inlet tube is charged with ethyl (2,3-dimethylphenoxy)acetate (21 g., 0.1 mole), benzene (40 ml.), concentrated hydrochloric acid (25 ml.) and formaldehyde (18 ml. of a 37% aqueous solution). The vigorously stirred solution is cooled to −8° C. in an ice-salt bath and treated with hydrogen chloride for 1.5 hours. The reaction mixture is stirred at room temperature for two hours and then the benzene layer is separated, washed with water and dried over magnesium sulfate. The benzene is distilled at reduced pressure and the product is recrystallized from petroleum ether to give 23.5 g. (92%) of ethyl [2,3-dimethyl-4-(chloromethyl)phenoxy] acetate, M.P. 72–74° C.

*Analysis.*—Calculated for $C_{13}H_{17}ClO_3$: C, 60.82; H, 6.67; Cl, 13.81. Found: C, 61.06; H, 6.61; Cl, 13.58.

Step C: Ethyl (2,3-dimethyl-4-formylphenoxy)acetate

A mixture of ethyl [2,3-dimethyl-4-(chloromethyl)-phenoxy]acetate (14.8 g., 0.057 mole), hexamethylenetetramine (14.7 g., 0.105 mole) and 60% aqueous ethanol (75 ml.) is refluxed for four hours. Concentrated hydrochloric acid (30 ml.) then is added to the reaction mixture and after five additional minutes of reflux, the mixture is poured into ice water. The product is extracted into ether and distilled to obtain 7.5 g. (56%) of ethyl (2,3-dimethyl-4-formylphenoxy)acetate, B.P. 140–145° C./0.05 mm.

*Analysis.*—Calculated for $C_{13}H_{16}O_4$: C, 66.08; H, 6.83. Found: C, 66.43; H, 6.99.

Step D: Ethyl [2,3 - dimethyl - 4-(2,2 - diacetylvinyl)-phenoxy]acetate

By following the procedure of Example 1, Step C(a), but substituting ethyl 2,3-dimethyl-4-formylphenoxy-acetate for the ethyl (2,3-dichloro-4-formylphenoxy)acetate recited therein there is obtained ethyl [2,3-dimethyl-4-(2,2-diacetylvinyl)phenoxy]acetate in 45% yield, M.P. 83–92° C. This product is used in the next step without further purification.

Step E: [2,3-dimethyl-4-(2,2-diacetylvinyl)phenoxy]-acetic acid

By following the procedure of Example 1, Step D, but substituting ethyl [2,3-dimethyl-4-(2,2-diacetylvinyl)-phenoxy]acetate for the ethyl [2,3-dichloro-4-(2,2-diacetylvinyl)phenoxy]acetate described therein there is obtained [2,3-dimethyl-4-(2,2-diacetylvinyl)phenoxy]acetic acid in 54% yield, M.P. 168.5–170.5° C.

*Analysis.*—Calculated for $C_{16}H_{18}O_5$: C, 66.19; H, 6.25. Found: C, 66.36; H, 6.18.

EXAMPLE 5.—[3-CHLORO-4-(2,2-DIACETYL-VINYL)PHENOXY]ACETIC ACID

Step A: Ethyl (3-chloro-4-formylphenoxy)acetate

By following the procedure of Example 1, Step B, but substituting 3-chloro-4-hydroxybenzaldehyde for the 2,3-dichloro-4-hydroxybenzaldehyde recited therein and recrystallizing the product from a mixture of benzene and cyclohexane there is obtained ethyl (3-chloro-4-formylphenoxy)acetate in 57% yield, M.P. 60–63° C.

Step B: Ethyl [3-chloro-4-(2,2-diacetylvinyl)phenoxy]-acetate

By following the procedure of Example 1, Step C(a), but substituting ethyl (3-chloro-4-formylphenoxy)acetate for the ethyl (2,3-dichloro-4-formylphenoxy acetate recited therein and recrystallizing the product from a mixture of cyclohexane and isopropyl alcohol, there is obtained ethyl [3-chloro-4-(2,2-diacetylvinyl)phenoxy]acetate in 45% yield, M.P. 55.5–57° C.

Analysis.—Calculated for $C_{16}H_{17}ClO_5$: C, 59.17; H, 5.28. Found: C, 59.21; H, 5.36.

Step C: [3-chloro-4-(2,2-diacetylvinyl)phenoxy]acetic acid

By following the procedure of Example 1, Step D, but substituting ethyl [3-chloro-4-(2,2-diacetylvinyl)phenoxy]-acetate for the ethyl [2,3-dichloro-4-(2,2-diacetylvinyl)-phenoxy]acetate recited therein and recrystallizing the product from isopropyl alcohol there is obtained [3-chloro-4-(2,2-diacetylvinyl)phenoxy]acetic acid in 68% yield, M.P. 158–161° C.

Analysis.—Calculated for $C_{14}H_{13}ClO_5$: C, 56.67; H, 4.42. Found: C, 56.82; H, 4.77.

EXAMPLE 6.—[4-(2,2-DIACETYLVINYL)-1-NAPHTHYLOXY]ACETIC ACID

Step A: Ethyl (4-formyl-1-naphthyloxy)acetate

A mixture of 4-formyl-1-naphthol (13 g., 0.075 mole), potassium carbonate (15 g., 0.15 mole), ethyl bromoacetate (25 g., 0.15 mole) and dimethylformamide (75 ml.) is stirred and heated at 55–60° C. for one hour. The mixture then is cooled and treated with water (500 ml.) and the precipitated product recrystallized from ethanol to yield 13.2 g. (68%) of ethyl (4-formyl-1-naphthyloxy) acetate, M.P. 99–100° C. After two recrystallizations from ethanol the melting point of the product is 100–101.5° C.

Analysis.—Calculated for $C_{15}H_{14}O_4$: C, 69.75; H, 5.46. Found: C, 69.18; H, 5.58.

Step B: Ethyl [4-(2,2-diacetylvinyl)-1-naphthyloxy]-acetate

A mixture of ethyl (4-formyl-1-naphthyloxy)acetate (7.1 g., 0.0275 mole), acetylacetone (3 g., 0.03 mole), piperidine (10 drops) and dimethylformamide (30 ml.) is allowed to stand at room temperature for two days. The solution then is diluted with water to precipitate the product which is recrystallized from ethanol to yield 3.8 g. (40%) of ethyl [4-(2,2-diacetylvinyl)-1-naphthyloxy] acetate, M.P. 118–120.5° C.

Analysis.—Calculated for $C_{20}H_{20}O_5$: C, 70.57; H, 5.92. Found: C, 70.12; H, 6.12.

Step C: [4-2,2-diacetylvinyl)-1-naphthyloxy]acetic acid

By following the procedure of Example 1, Step D, but substituting ethyl [4-(2,2-diacetylvinyl)-1-naphthyloxy]-acetate for the ethyl [2,3-dichloro-4-(2,2-diacetylvinyl)-phenoxy]acetate recited therein there is obtained [4-(2,2-diacetylvinyl)-1-naphthyloxy]acetic acid, M.P. 185.5–188.5° C. in 48% yield.

Analysis.—Calculated for $C_{18}H_{16}O_5$: C, 69.22; H, 5.16. Found: C, 69.13; H, 5.24.

EXAMPLE 7.—[2,3 - DICHLORO - 4 - (2 - ACETYL-2-PROPIONYLVINYL)PHENOXY]ACETIC ACID

A mixture of ethyl (2,3-dichloro-4-formylphenoxy)acetate (16.6 g., 0.06 mole), obtained as described in Example 1, Step B, propionylacetone (8.0 g., 0.07 mole), piperidine (2 ml.) and ethanol (240 ml.) is allowed to stand at room temperature for three days. The solvent then is removed by vacuum distillation, the residual oil is taken up in ether and the solution washed with water. Evaporation of the ether leaves 24 g., of oily ethyl [2,3-dichloro-4-(2-acetyl-2-propionylvinyl)phenoxy]acetate.

A solution of ethyl [2,3-dichloro-4-(2-acetyl-2-propionylvinyl)phenoxy]acetate in acetic acid (80 ml.) and 5% hydrochloric acid (50 ml.) is heated on the steam bath for 45 minutes. The solution is cooled and diluted with water to precipitate a gummy product. Trituration of this substance with isopropyl alcohol yields a crystalline product which is recrystallized two times from isopropyl alcohol to obtain 1.5 g., of [2,3-dichloro-4-(2-acetyl-2-propionylvinyl)phenoxy]acetic acid, M.P. 185.5–186.5° C.

Analysis.—Calculated for $C_{15}H_{14}Cl_2O_5$: C, 52.19; H, 4.09. Found: C, 52.56; H, 4.43.

EXAMPLE 8.—[2,3-DICHLORO-4-(2,2-DIPROPIONYLVINYL)PHENOXY]ACETIC ACID

A mixture of ethyl (2,3-dichloro-4-formylphenoxy)-acetate (11.1 g., 0.04 mole), obtained as described in Example 1, Step B, 3,5-heptanedione (7.7 g., 0.06 mole), piperidine (1.5 ml.) and ethanol (160 ml.) is allowed to stand at room temperature for four days. The solvent then is removed by vacuum distillation and the residual oil is taken up in ether and washed with water. Evaporation of the ether leaves 16 g. of oily ethyl[2,3-dichloro-4-(2,2-dipropionylvinyl)phenoxy]acetate. A solution of this compound in acetic acid (60 ml.) and 5% hydrochloric acid (30 ml.) is heated on the steam bath for 45 minutes and the solution then is cooled and diluted with water (80 ml.). The product which separates is recrystallized from ethyl acetate to obtain 2.8 g. (19%) of [2,3-dichloro - 4 - (2,2 - dipropionylvinyl)phenoxy]acetic acid, M.P. 168–170° C.

Analysis.—Calculated for $C_{16}H_{16}Cl_2O_5$: C, 53.50; H, 4.49. Found: C, 53.63; H, 4.73.

EXAMPLE 9.—[4-(2,2-DIACETYLVINYL)PHENOXY]ACETIC ACID

Step A: Ethyl [4-(2,2-diacetylvinyl)phenoxy]acetate

By following the procedure of Example 1, Step C(a), but substituting ethyl (4-formylphenoxy)acetate for the ethyl (2,3-dichloro - 4 - formylphenoxyl)acetate recited therein and recrystallizing the product from a mixture of cyclohexane and benzene, there is obtained ethyl [4-(2,2-diacetylvinyl)phenoxy]acetate in 63% yield, M.P. 85.5–86.5° C.

Analysis.—Calculated for $C_{16}H_{18}O_5$: C, 66.19; H, 6.25. Found; C, 65.99; H, 6.19.

Step B: [4-(2,2-diacetylvinyl)phenoxy]acetic acid

By following the procedure of Example 1, Step D, but substituting ethyl [4-(2,2-diacetylvinyl)phenoxy]acetate for the ethyl [2,3-dichloro-4-(2,2-diacetylvinyl)phenoxy]-acetate recited therein and recrystallizing the product from ethyl acetate, there is obtained [4-(2,2-diacetylvinyl)phenoxy]acetic acid in 52% yield, M.P. 172.5–174.5° C.

Analysis.—Calculated for $C_{14}H_{14}O_5$: C, 64.11; H, 5.38; Found: C, 63.88; H, 5.30.

EXAMPLE 10.—2 - [2,3 - DICHLORO - 4 - (2,2 - DIACETYLVINYL)PHENOXY]PROPIONIC ACID

Step A.—Ethyl 2-(2,3-dichloro-4-formylphenoxy)-propionate

A mixture of 2,3-dichloro-4-hydroxybenzaldehyde (Example 1, Step A) (6.0 g., 0.026 mole), ethyl α-bromopropionate (9.2 g., 0.051 mole), potassium carbonate (5.2 g., 0.038 mole) and dimethylformamide (25 ml.)

is stirred and heated at 55–60° C. for 16 hours. The mixture is diluted with water and the solid that separates is recrystallized from cyclohexane to obtain 4.6 g. (61%) of ethyl 2-(2,3-dichloro-4-formylphenoxy)propionate, M.P. 67.5–68.5° C.

*Analysis.*—Calculated for $C_{12}H_{12}Cl_2O_4$: C, 49.51; H, 4.15; Cl, 24.36. Found: C, 49.97; H, 4.57; Cl, 23.78.

Step B.—Ethyl 2-[2,3-dichloro-4-(2,2-diacetylvinyl)-phenoxy]propionate

A mixture of ethyl 2-(2,3-dichloro-4-formylphenoxy)propionate (7.25 g., 0.025 mole), acetyl acetone (2.5 g., 0.025 mole), piperidine (0.6 g.) and ethanol (13 ml.) is stirred and warmed at 45° C. for 20 minutes. The solution is allowed to stand at room temperature for three hours and then is chilled overnight.

The crystalline product is collected to obtain 7.5 g. (87.5%) of ethyl 2[2,3-dichloro-4-(2,2-diacetylvinyl)-phenoxy]propionate, M.P. 110–112° C. After recrystallization from a mixture of ethyl acetate and hexane the product melts at 112–113° C.

*Analysis.*—Calculated for $C_{17}H_{18}Cl_2O_5$: C, 54.70; H, 4.86. Found: C, 54.83; H, 5.05.

Step C.—2-[2,3-dichloro-4-(2,2-diacetylvinyl)phenoxy]-propionic acid

By folowing the procedure of Example 1, Step D, but substituting ethyl 2[2,3-dichloro-4-(2,2-diacetylvinyl)-phenoxy]propionate for the ethyl [2,3-dichloro-4-(2,2-diacetylvinyl)phenoxy]acetate recited therein and recrystallizing the product from a mixture of ethyl acetate and hexane there is obtained 2-[2,3-dichloro-4-(2,2-diacetylvinyl)phenoxy]propionic acid in 36% yield, M.P. 152–154° C.

*Analysis.*—Calculated for $C_{15}H_{14}Cl_2O_5$: C, 52.19; H, 4.09. Found: C, 52.55; H, 4.10.

EXAMPLE 11.—[3-(2,2-DIACETYLVINYL)-4-CHLOROPHENOXY]ACETIC ACID

Step A.—Ethyl (3-formyl-4-chlorophenoxy)acetate

A suspension of 3-hydroxy-6-chlorobenzaldehyde (7.6 g., 0.0396 mole) and potassium carbonate (13.2 g., 0.1 mole) in dimethylformamide (30 ml.) is treated with ethyl bromoacetate (16.7 g., 0.1 mole). This mixture is stirred at 55° C. for 1.5 hours and then cooled, diluted with water and extracted with ether. The ethereal solution is washed with water, dried and concentrated in vacuo to produce an oil which then is distilled to yield an oily product having a boiling point of 155–175° C./.05 mm. This product crystallizes to give 3.6 g. (38%) of ethyl (3-formyl-4-chlorophenoxy)acetate having a melting point of 54–56° C. After recrystallization from butyl chloride the ethyl (3-formyl-4-chlorophenoxy)acetate has a melting point of 58–60°C.

*Analysis.*—Calculated for $C_{11}H_{11}ClO_4$: C, 54.44; H. 4.57; Found: C, 54.67; H, 4.76.

Step B.—[3-(2,2-diacetylvinyl)-4-chlorophenoxy]acetic acid

A mixture of ethyl (3-formyl-4-chlorophenoxy)acetate (4 g., 0.0165 mole), acetyl acetone (1.65. g., 0.0165 mole), piperidine (0.4 ml.) and ethanol (15 ml.) is stirred and warmed at 45° C. for 20 minutes. The solution is kept at room temperature for three hours and then cooled overnight. The solution is diluted with ether, washed with water, dried and concentrated to give 5.5 g. of an oil, which is ethyl [3-(2,2-diacetylvinyl)-4-chlorophenoxy]acetate.

The ethyl [3-(2,2-diacetylvinyl)-4-chlorophenoxy]acetate is dissolved in acetic acid (25 ml.) and 5% hydrochloric acid (14 ml.) and the solution heated at 100° C. for one hour. The solution then is extracted with ether and the ether phase extracted with a saturated sodium bicarbonate solution. The aqueous layer is acidified and the product extracted into ether. The ether solution is evaporated and the product recrystallized from a mixture of ethyl acetate and hexane to obtain 2.5 g. (48.5%) of [3-(2,2 - diacetylvinyl) - 4 - chlorophenoxy]acetic acid having a melting point of 98–100° C. After recrystallization from butyl chloride the product melts at 102–104° C.

*Analysis.*—Calculated for $C_{14}H_{13}ClO_5$: C, 56.67; H, 4.42. Found: C, 56.63; H, 4.63.

EXAMPLE 12.—[2-(2,2-DIACETYLVINYL)-4-CHLOROPHENOXY]ACETIC ACID

Step A: Ethyl (2-formyl-4-chlorophenoxy)acetate

By following the procedure of Example 1, Step B, but substituting 5-chlorosalicylaldehyde for the 2,3-dichloro-4-hydroxybenzaldehyde recited therein and recrystallizing the product from a mixture of benzene and cyclohexane, there is obtained ethyl (2-formyl-4-chlorophenoxy)acetate in 71% yield, M.P. 51–54.5° C.

Step B: Ethyl [2-(2,2-diacetylvinyl)-4-chlorophenoxy]acetate

By following the procedure of Example 1, Step C(a), but substituting ethyl (2-formyl-4-chlorophenoxy)acetate for the ethyl (2,3-dichloro-4-formylphenoxy)acetate recited therein and recrystallizing the resulting product from a mixture of cyclohexane and benzene there is obtained ethyl [2-(2,2-diacetylvinyl)-4-chlorophenoxy]acetate in 77% yield, M.P. 82.5–84.5° C.

*Analysis.*—Calculated for $C_{16}H_{17}ClO_5$: C, 59.17; H, 5.28. Found: C, 59.34; H, 5.36.

Step C: [2-(2,2-diacetylvinyl)-4-chlorophenoxy]acetic acid

By following the procedure of Example 1, Step D, but substituting ethyl [2-(2,2-diacetylvinyl) - 4 - chlorophenoxy]acetate for the ethyl [2,3-dichloro-4-(2,2-diacetylvinyl)phenoxy]acetate recited therein and recrystallizing the resulting product from ethyl acetate there is obtained [2-(2,2-diacetylvinyl) - 4 - chlorophenoxy]acetic acid in 51% yield, M.P. 146.5–149° C.

*Analysis.*—Calculated for $C_{14}H_{13}ClO_5$: C, 56.67; H, 4.42. Found: C, 56.93; H, 4.57.

EXAMPLE 13.—[2-(2,2-DIACETYLVINYL)-4-ACETAMIDOPHENOXY]ACETIC ACID

By substituting 5-acetamidosalicylaldehyde for the 5-chlorosalicylaldehyde of Example 12, Step A, and following substantially the procedure described in Steps A, B and C of that example the product [2-(2,2-diacetylvinyl)-4-acetamidophenoxy]acetic acid is prepared.

EXAMPLE 14.—[2-(2,2-DIACETYLVINYL)-4,6-DICHLOROPHENOXY]ACETIC ACID

Step A: Ethyl (2-formyl-4,6-dichlorophenoxy)acetate

By following the procedure of Example 1, Step B, but substituting 3,5-dichlorosalicylaldehyde for the 2,3-dichloro-4-hydroxybenzaldehyde recited therein and recrystallizing the resulting product from aqueous ethanol, there is obtained ethyl (2-formyl-4,6-dichlorophenoxy)acetate in 85% yield, M.P. 52–53° C.

*Analysis.*—Calculated for $C_{11}H_{10}Cl_2O_4$: C, 47.69; H, 3.64; Cl, 25.60. Found: C, 47.65; H, 3.97; Cl, 25.46.

Step B: Ethyl [2-(2,2-diacetylvinyl)4,6-dichlorophenoxy]acetate

A mixture of ethyl (2-formyl-4,6-dichlorophenoxy)acetate (11.1 g., 0.04 mole), acetylacetone (4 g., 0.04 mole), piperidine (1. ml.) and ethanol (20 ml.) is stirred and warmed at 45° C. for 30 minutes. The solution is kept at room temperature for three hours and then cooled overnight.

The crystalline product is collected to obtain 12 g. (70%) of ethyl [2-(2,2-diacetylvinyl)-4,6-dichlorophenoxy]acetate having a melting point of 83–85° C.

A sample of ethyl [2-(2,2-diacetylvinyl)-4,6-dichlorophenoxy]acetate further crystallized from a mixture of ethyl acetate and hexane has a melting point of 85–87° C.

*Analysis.*—Calculated for $C_{16}H_{16}Cl_2O_5$: C, 53.50; H, 4.49. Found: C, 53.62; H, 4.66.

Step C: [2-(2,2-diacetylvinyl)-4,6-dichlorophenoxy] acetic acid

By following the procedure of Example 1, Step D, but substituting ethyl [2-(2,2-diacetylvinyl)-4,6-dichlorophenoxy]acetate for the ethyl [2,3-dichloro-4-(2,2-diacetylvinyl)phenoxy]acetate recited therein and recrystallizing the following product from a mixture of ethyl acetate and hexane, there is obtained [2-(2,2-diacetylvinyl)-4,6-dichlorophenoxy]acetic acid in 29% yield, M.P. 113.5–115.5° C.

*Analysis.*—Calculated for $C_{14}H_{12}Cl_2O_5$: C, 50.77; H, 3.65. Found: C, 50.83; H, 3.96.

EXAMPLE 15.—[2,3-DICHLORO-4-(2-ACETYL-2-BENZOYLVINYL)PHENOXY]ACETIC ACID

Step A: Ethyl [2,3-dichloro-4-(2-acetyl-2-benzoylvinyl)phenoxy]acetate

A 250 ml. round-bottom flask fitted with a nitrogen inlet tube, constant water separator and reflux condenser capped with a calcium chloride drying tube is charged with ethyl (2,3-dichloro-4-formylphenoxy)acetate (Example 1, Step B) (.54 g., 0.02 mole), 1-phenyl-1,3-butanedione (3.25 g., 0.02 mole), piperidine acetate (100 mg.) and dry toluene (50 ml.).

The reaction mixture is refluxed until the theoretical amount of water (0.36 ml.) is collected, i.e., about 1.5 hours. The toluene is removed by distillation at reduced pressure, the residual oil is triturated with ethanol (50 ml.) and the solid that forms is recrystallized from ethanol to give ethyl [2,3-dichloro-4-(2-acetyl-2-benzoylvinyl)phenoxy]acetate (6.0 g., 72%) which melts at 98.5–100.5° C.

*Analysis.*—Calculated for $C_{21}H_{18}Cl_2O_5$: C, 59.87; H, 4.31; Cl, 16.83. Found: C, 59.99; H, 4.37; Cl. 16.70.

Step B: [2,3-dichloro-4-(2-acetyl-2-benzoylvinyl)phenoxy]acetic acid

A stirred solution of ethyl [2,3-dichloro-4-(2-acetyl-2-benzoylvinyl(phenoxy]acetate (3.9 g., 0.0093 mole), acetic acid (15 ml.) and 5% hydrochloric acid (7 ml.) is heated on a steam bath for 45 minutes and then is treated with water (20 ml.) and cooled. The product which separates (2.9 g. 80%) is recrystallized from a mixture of butanone and hexane to yield [2,3-dichloro-4-(2-acetyl-2-benzoylvinyl)phenoxy]acetic acid having a melting point of 170–171° C.

*Analysis.*—Calculated for $C_{19}H_{14}Cl_2O_5$: C, 58.03; H, 3.59; Cl, 18.03. Found: C, 57.77; H, 3.74; Cl, 18.19.

EXAMPLE 16.—N - METHOXY - 2 - [2,3 - DICHLORO - 4 - (2,2 - DIACETYLVINYL)PHENOXY]-ACETAMIDE

A mixture of [2,3-dichloro-4-(2,2-diacetylvinyl)-phenoxy]acetic acid (1.6 g., 0.005 mole), obtained as described in Example 1, thionyl chloride (2.4 g., 0.02 mole) and benzene (15 ml.) is refluxed for 35 minutes whereby a clear solution is obtained. Then the volatile materials are removed by vacuum distillation leaving [2,3-dichloro-4-(2,2-diacetylvinyl)phenoxy]acetyl chloride as a viscous oil.

A solution of methoxyamine is prepared by adding methoxyamine hydrochloride (1.3 g., 0.015 mole) to a solution of sodium (0.35 g., 0.015 mole) in ethanol (8 ml.). To this solution [2,3-dichloro-4-(2,2-diacetylvinyl)-phenoxy]acetyl chloride is added and, after 10 minutes, the mixture is diluted with water (20 ml.) to precipitate the solid product. Recrystallization from isopropyl alcohol gives 0.3 g. (17% of pure N-methoxy-2-[2,3-dichloro-4 - (2,2 - diacetylvinyl)phenoxy]acetamide, M.P. 159.5–162° C.

*Analysis.*—Calculated for $C_{15}H_{15}Cl_2NO_5$: C, 50.02; H, 4.19; N, 3.89. Found: C, 50.19; H, 4.51; N, 3.79.

EXAMPLE 17.—N - BENZYL - 2 - [2,3-DICHLORO-4-(2,2-DIACETYLVINYL)PHENOXY]-ACETAMIDE

N-ethyl-5-phenylisoxazolium-3'-sulfonate (1.2 g., 0.005 mole) is added to a solution of [2,3-dichloro-4-(2,2-diacetylvinyl)phenoxy]acetic acid (1.6 g., 0.005 mole) obtained as described in Example 1, and triethylamine (0.5 g., 0.005 mole) in acetonitrile (10 ml.) and the mixture is stirred 30 minutes to obtain a clear solution. Benzylamine (0.6 g., 0.005 mole) is added, and the solution is allowed to stand one hour at room temperature. The solution is diluted with water (20 ml.) to precipitate the product which is recrystallized from a mixture of benzene and cyclohexane to obtain 1.0 g. (48%) of N-benzyl-2 - [2,3 - dichloro-4 - (2,2 - diacetylvinyl)phenoxy]acetamide, M.P. 126.5–129.5° C.

*Analysis.*—Calculated for $C_{21}H_{19}Cl_2NO_4$: C, 60.01; H, 4.56; N, 3.33. Found: C, 60.20; H, 4.49; N, 3.34.

EXAMPLE 18.—[2,3-DICHLORO-4-(2,2-DIACETYLVINYL)PHENOXY]ACETAMIDE

A mixture of [2,3-dichloro-4-(2,2-diacetylvinyl)-phenoxy]acetic acid (4 g., 0.012 mole), obtained as described in Example 1, thionyl chloride (24.6 g., 0.206 mole), and benzene (15 ml.) is refluxed for three hours whereby a clear solution is obtained. Volatile materials are removed by vacuum distillation leaving [2,3-dichloro-4-(2,2-diacetylvinyl)phenoxy]acetyl chloride as a viscous oil.

Anhydrous ammonia is added over 15 minutes to the oily [2,3-dichloro-4 - (2,2 - diacetylvinyl)phenoxy]acetyl chloride in benzene (50 ml.). After removal of ammonium chloride by filtration the filtrate is concentrated to yield 1.0 g. of solid [2,3-dichloro-4-(2,2-diacetylvinyl) phenoxy]-acetamide, M.P. 189–192° C.

Recrystallization of the product from ethyl acetate gives 800 mg. (20%) of pure [2,3-dichloro-4-(2,2-diacetylvinyl)phenoxy]acetamide, M.P. 194.5–196.5° C.

*Analysis.*—Calculated for $C_{14}H_{13}Cl_2NO_4$: C, 50.93; H, 3.97; N, 4.24. Found: C, 50.89; H, 4.03; N, 4.22.

EXAMPLE 19.—2-DIETHYLAMINOETHYL [2,3 - DICHLORO - 4 - (2,2-DIACETYLVINYL)PHENOXY] ACETATE HYDROCHLORIDE

A mixture of [2,3-dichloro-4 - (2,2 - diacetylvinyl)phenoxy]acetic acid (3.3 g., 0.01 mole), obtained as described in Example 1, thionyl chloride (4.8 g., 0.04 mole) and benzene (30 ml.) is refluxed for 35 minutes whereby a clear solution is obtained. Volatile materials are removed by vacuum distillation leaving [2,3-dichloro-4-(2,2-diacetylvinyl)phenoxy]acetyl chloride as a viscous oil and the said acid chloride is added to a solution of 2-diethylaminoethanol (2.8 g., 0.024 mole) in ether (50 ml.). The resulting mixture is extracted with water and the ether solution dried and treated with hydrogen chloride to precipitate the hydrochloride salt of the product. Recrystallization from isopropyl alcohol gives 1.7 g. (37%) of 2-diethylaminoethyl [2,3-dichloro-4 - (2,2 - diacetylvinyl)phenoxy]acetate hydrochloride, M.P. 137.5–140.5° C.

*Analysis.*—Calculated for $C_{20}H_{25}Cl_2NO_5 \cdot HCl$: C, 51.46; H, 5.61; N, 3.00. Found: C, 51.71; H, 5.68; N, 2.94.

EXAMPLE 20.—3-[2,3-DICHLORO-4-(2,2-DIACETYLVINYL)PHENOXY]PROPIONIC ACID

Step A: 3-(2,3-dichloro-4-formylphenoxy)propionic acid 2,3 - dichloro - 4 - hydroxybenzaldehyde (38.2 g., 0.2 mole), obtained as described in Example 1, Step A, is dissolved in a 10% sodium hydroxide solution (200 ml.). The solution is heated to boiling and beta-propiolactone (144 g., 2.0 moles) is added dropwise at such a rate as to keep the solution boiling. During the addition 10% sodium hydroxide solution is added in portions to keep the mixture alkaline. Then the solution is cooled and acidified. The precipitated material is dissolved in ether and the product is extracted into a 5% sodium bicarbonate solution. Acidification of the aqueous solution precipitates 3-(2,3-dichloro-4-formylphenoxy)propionic acid which is purified by recrystallization from ethyl acetate.

Step B: 3-[2,3-dichloro-4-(2,2-diacetylvinyl)phenoxy]propionic acid

By following substantially the process described in Example 2, Step B, but substituting 3-2,3-dichloro-4-formylphenoxy)propionic acid for the (2,3-dichloro-4-formylphenoxy)acetic acid recited therein, the compound 3-[2,3-dichloro-4-(2,2 - diacetylvinyl)phenoxy]propionic acid is obtained.

EXAMPLE 21.—[4-(2,2-DIACETYLVINYL)PHENOXY]ACETIC ACID

Step A: 3-(4-hydroxybenzylidene)-2,4-pentanedione

A solution of 4-hydroxybenzaldehyde (48.8 g., 0.4 mole), acetylacetone (45 g., 0.45 mole), piperidine (5 ml.) and ethanol (100 ml.) is allowed to stand at room temperature for three days. The reaction mixture is chilled to 5° C. and allowed to stand overnight and the solid that separates is removed by filtration and recrystallized from a mixture of isopropyl alcohol (70 ml.) and water (120 ml.). The yield of 3-(4-hydroxybenzylidene)-2,4-pentanedione thus obtained is 40 g. (49%), M.P. 118–130° C. Recrystallization from a mixture of isopropyl alcohol (60 ml.) and water (100 ml.) yields 3-(4-hydroxybenzylidene)-2,4-pentanedione melting at 127–130° C.

*Analysis.*—Calculated for $C_{12}H_{12}O_3$: C, 70.57; H, 5.92. Found: C, 70.52; H, 6.08.

Step B: [4-(2,2-diacetylvinyl)phenoxy]acetic acid

A 150 ml. flask equipped with a mechanical stirrer and condenser capped with a calcium chloride drying tube is charged with 3-(4-hydroxybenzylidene)-2,3-pentanedione (1.72 g., 0.00843 mole), iodoacetic acid (1.86 g., 0.01 mole), potassium carbonate (1.38 g., 0.01 mole) and acetone (80 ml.). The mixture is stirred and refluxed for 16 hours, cooled and filtered to remove a yellow solid (3.2 g.) which is dissolved in water (20 ml.). The resulting solution is acidified with 6 N hydrochloric acid and the solid that separates is removed by filtration, dried and recrystallized from acetic acid. The yield of [4-(2,2-diacetylvinyl)-phenoxy]acetic acid thus obtained is 890 mg. (40%). After a second recrystallization from acetic acid the M.P. of the product is 172.5–174.5° C.

EXAMPLE 22.—[2,3-DICHLORO-4-(2,2-DIACETYLVINYL)PHENOXY]ACETIC ACID

A 150 ml. flask equipped with a mechanical stirrer and reflux condenser capped with a calcium chloride tube is charged with 3-(2,3-dichloro-4-hydroxybenzylidene)-2,4-pentanedione (2.41 g., 0.00883 mole), obtained as described in Example 3, Step A, iodoacetic acid (1.86 g., 0.01 mole), potassium carbonate (1.38 g., 0.01 mole) and acetone (80 ml.). The mixture is stirred and refluxed for 24 hours and then cooled and filtered. The yellow solid which is isolated is washed with acetone and then with ether and finally dried to yield 3.90 g. of product. The solid is dissolved in water (70 ml.) and acidified with 6 N hydrochloric acid. The white solid that separates is removed by filtration, washed with water and dried. After three recrystallizations from isopropyl alcohol the yield of [2,3-dichloro-4-(2,2-diacetylvinyl)phenoxy]acetic acid is 700 mg. (27%), M.P. 184.5–186.5° C.

EXAMPLE 23.—[2,3-DICHLORO-4-(2,2-DIACETYLVINYL)PHENOXY]FLUOROACETIC ACID

To a solution of 2,3-dichloro-4-(2,2-diacetylvinyl)-phenol (5.46 g., 0.02 mole) in dimethylformamide (22 ml.) is added potassium carbonate (6.08 g., 0.044 mole). Then ethyl bromofluoroacetate (8.14 g., 0.044 mole) is added and the reaction mixture is heated at 55–60° C. for 1.5 hours with stirring.

The reaction mixture is cooled in ice and treated with water (110 ml.). The resulting oil is extracted with ether and the solvent is removed under reduced pressure to give an oily residue.

The residual ester is treated with a mixture of acetic acid (34 ml.) and 5% hydrochloric acid (17 ml.) and heated on a steam bath for 0.5 hour with stirring. The cooled reaction solution is diluted with water (51 ml.) and a solid separates. There is thus obtained 5.32 g. of material, M.P. 147–155° C. Recrystallization from a mixture of ethyl acetate and cyclohexane gives [2,3-dichloro-4-(2,2-diacetylvinyl)phenoxy]fluoroacetic acid in the form of light yellow needles, M.P. 159–160° C.

*Analysis.*—Calculated for $C_{14}H_{11}C_{12}FO_5$: C, 48.16; H, 3.18. Found: C, 48.42; H, 3.35.

In a manner similar to that described in Example 1, Steps B–D, supra, for the preparation of [2,3-dichloro-4-(2,2-diacetylvinyl)phenoxy]acetic acid, all of the [(2,2-diacylvinyl)aryloxy(and arylthio)]alkanoic acid products (I) of the invention may be obtained. Thus, by substituting the appropriate nuclear hydroxy (or mercapto) substituted benzaldehyde and a suitable alkyl haloalkanoate for the 2,3-dichloro-4-hydroxybenzaldehyde and ethyl bromoacetate reactants recited in Example 1, Step B, and following substantially the procedure described in Steps B, C(a) and D of that example the corresponding [(2,2-diacylvinyl)-aryloxy(and arylthio)]alkanoic acid products (I) may be obtained. The following equations illustrate the reaction of Example 1, Steps B, C(a) and D and, together with Table I, depict the nuclear hydroxy (or mercapto) substituted benzaldehyde and alkyl haloalkanoate starting materials of the said process and the corresponding products produced thereby:

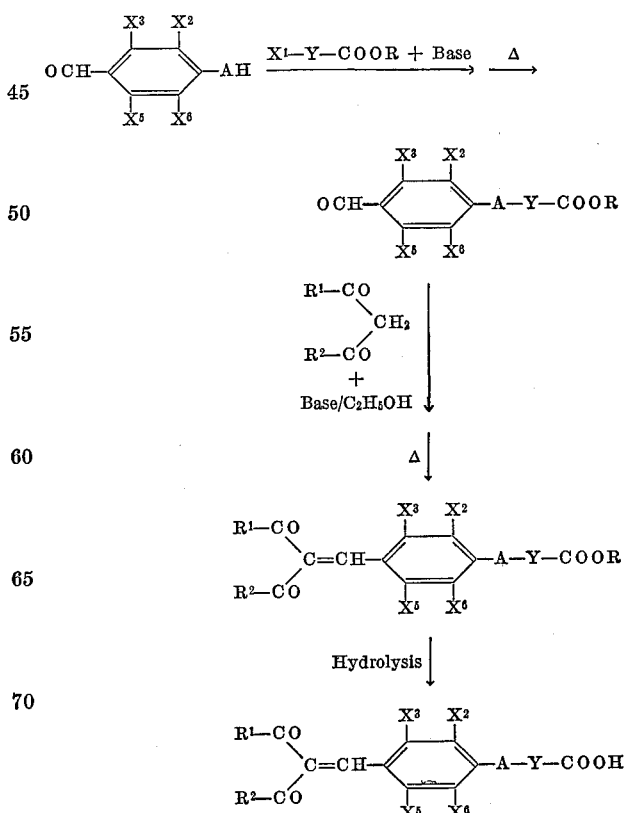

TABLE I

| Example: | R | R₁ | R₂ | X₂ | X₃ | X₅ | X₆ | A | Y |
|---|---|---|---|---|---|---|---|---|---|
| 24 | —C₂H₅ | —CH₃ | —CH₃ | H | H | H | H | S | —CH₂— |
| 25 | —CH₃ | —CH₃ | —CH₃ | H | —OCH₃ | H | H | O | —CH₂— |
| 26 | —C₂H₅ | —CH₃ | —CH₃ | H | NO₂ | H | H | O | —CH₂— |
| 27 | —C₃H₇ | —CH₂—C₆H₅ | —CH₃ | Cl | Cl | H | H | O | —CH₂— |
| 28 | —C₂H₅ | —C₂H₅ | —CH₃ | H | H | H | H | S | —CH₂— |
| 29 | —CH₃ | —C₆H₄(OCH₃) | —CH₃ | Cl | Cl | H | H | O | —CH₂— |
| 30 | —CH₃ | —C₆H₄—Br | —CH₃ | H | Br | H | H | O | —CH₂— |
| 31 | —C₂H₅ | —C₂H₅ | —C₂H₅ | —CH₃ | H | H | —CH₃ | O | —CH₂— |
| 32 | —CH₃ | —C₂H₅ | —CH₃ | H | Cl | H | H | O | —(CH₂)₃— |
| 33 | —C₂H₅ | —CH₂—C₆H₄(OCH₃) | —CH₃ | —CH₃ | —CH₃ | —CH₃ | —CH₃ | O | —CHCH₃— |
| 34 | —C₂H₅ | —C₆H₄—CH₃ | —CH₃ | Cl | Cl | H | H | O | —CH₂— |
| 35 | —CH₃ | —CH₃ | —CH₃ | H | F | H | H | O | —CH₂— |
| 36 | —C₄H₉ | —C₆H₅ | —CH₃ | H | H | H | H | S | —CH₂— |
| 37 | —CH₃ | —C₂H₅ | —C₂H₅ | H | —CH₃ | H | H | O | —(CH₂)₃— |
| 38 | —C₂H₅ | —CH₃ | —CH₃ | —(CH₂)₄— | | H | H | O | —CH₂— |

The products of the invention are diuretic and saluretic agents which can be administered in a wide variety of therapeutic dosages in conventional vehicles as, for example, by oral administration in the form of a tablet as well as by intravenous injection. Also, the dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 20 mg. of a [(2,2-diacylvinyl)aryloxy(and arylthio)]alkanoic acid (I) or a suitable acid addition salt, ester or amide derivative thereof, with 174 mg. of lactose and 6 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 39.—DRY-FILLED CAPSULES CONTAINING 20 MG. OF ACTIVE INGREDIENT PER CAPSULE

| | Per capsule, mg. |
|---|---|
| 2,3 - dichloro - 4 - (2,2 - diacetylvinyl)phenoxyacetic acid | 20 |
| Lactose | 174 |
| Magnesium stearate | 6 |
| Capsule size No. 1 | 200 |

The [2,3-dichloro-4 - (2,2 - diacetylvinyl)phenoxy]acetic acid is reduced to a No. 60 powder and then lactose and magnesium stearate are passed through a No. 60 bolting cloth onto the powder and the combined ingredients admixed for 10 minutes and then filled into No. 1 dry gelatin capsules.

Similar dry-filled capsules can be prepared by replacing the active ingredient of the above example by any of the other novel compounds of this invention.

It will be apparent from the foregoing description that the [(2,2-diacylvinyl)aryloxy(and arylthio)]alkanoic and products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A member selected from the group consisting of a compound having the formula:

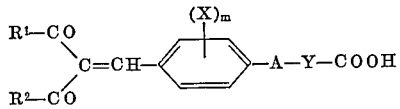

wherein A is a member selected from the group consisting of oxygen and sulfur; $R^1$ and $R^2$ are similar or dissimilar members selected from the group consisting of lower alkyl, mononuclear aryl and mononuclear aralkyl wherein the said aryl and aralkyl radicals may be unsubstituted or substituted by one or more similar or dissimilar substituents selected from the group consisting of halogen, lower alkyl and lower alkoxy; the X radicals are similar or dissimilar members selected from the group consisting of hydrogen, halogen, lower alkyl, lower alkoxy, nitro, lower alkanamido and, taken together, two X radicals on adjacent carbon atoms of the benzene ring may be joined to form an hydrocarbylene chain selected from trimethylene, tetramethylene and 1,3-butadienylene; Y is a member selected from the group consisting of alkylene and haloalkylene and $m$ is an integer having a value of one to four; and the nontoxic, pharmacologically acceptable salts, lower alkyl esters and amide derivatives thereof wherein the amido moiety is a radical of the formula —$NR^4R^5$ wherein $R^4$ and $R^5$ represent hydrogen, alkyl, hydroxyalkyl, haloalkyl, mononuclear aralkyl, lower alkoxyalkyl and dialkylamino alkyl.

2. A compound having the formula:

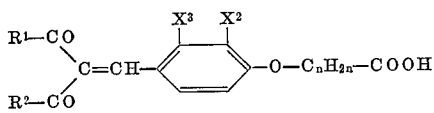

wherein $R^1$ and $R^2$ are lower alkyl; $X^2$ and $X^3$ are similar or dissimilar members selected from the group consisting of hydrogen, halogen, lower alkyl and, taken together, may be joined to form 1,3-butadienylene and $n$ is an integer having a value of one to three.

3. [4-(2,2 - di - lower alkanoylvinyl)phenoxy]alkanoic acid.

4. [3-halo - 4 - (2,2-di-lower alkanoylvinyl)phenoxy] alkanoic acid.

5. [2,3-dihalo-4-(2,2-di-lower alkanoylvinyl)phenoxy] alkanoic acid.

6. [3-lower alkyl-4 - (2,2 - di-lower alkanoylvinyl)phenoxy]alkanoic acid.

7. [2,3-di-lower alkyl - 4 - (2,2-di-lower alkanoylvinyl) phenoxy]alkanoic acid.

8. [2-lower alkyl-3-halo-4-(2,2-di-lower alkanoylvinyl) phenoxy]alkanoic acid.

9. [2-halo-3-lower alkyl-4-(2,2-di-lower alkanoylvinyl) phenoxy]alkanoic acid.

10. [4 - (2,2 - di - lower alkanoylvinyl)-1-naphthyloxy] alkanoic acid.

11. [4-(2,2-diacetylvinyl)phenoxy]acetic acid.

12. [3-chloro - 4 - (2,2 - diacetylvinyl)phenoxy]acetic acid.

13. [3-(2,2-diacetylvinyl)-4-chlorophenoxy]acetic acid.

14. [2-(2,2-diacetylvinyl)-4-chlorophenoxy]acetic acid.

15. [2-(2,2-diacetylvinyl)-4,6 - dichlorophenoxy]acetic acid.

16. [2,3-dichloro-4-(2,2 - diacetylvinyl)phenoxy]acetic acid.

17. [2,3-dichloro-4-(2-acetyl - 2 - propionylvinyl)phenoxy]acetic acid.

18. [2,3-dichloro-4 - (2,2 - dipropionylvinyl)phenoxy] acetic acid.

19. 2-[2,3-dichloro-4-(2,2 - diacetylvinyl)phenoxy]propionic acid.

20. [2,3-dichloro-4-(2-acetyl-2-benzoylvinyl)phenoxy] acetic acid.

21. Ethyl [2,3-dichloro-4-(2,2 - diacetylvinyl)phenoxy] acetate.

22. 2-diethylaminoethyl [2,3-dichloro-4-(2,2 - diacetylvinyl)phenoxy]acetate hydrochloride.

23. N-methoxy-2-[2,3-dichloro - 4 - (2,2-diacetylvinyl) phenoxy]acetamide.

24. N-benzyl-2-[2,3-dichloro - 4 - (2,2 - diacetylvinyl) phenoxy]acetamide.

25. [2,3-dichloro - 4 - (2,2-diacetylvinyl)phenoxy]acetamide.

26. [2,3-dimethyl - 4-(2,2-diacetylvinyl)phenoxy]acetic acid.

27. [4-(2,2-diacetylvinyl)-1-naphthyloxy]acetic acid.

28. [2-methyl-3-chloro - 4-(2,2-diacetylvinyl)phenoxy] acetic acid.

29. [2-chloro-3-methyl - 4-(2,2-diacetylvinyl)phenoxy] acetic acid.

References Cited

Delest et al.: Chem. Abstracts (1958), vol. 52, p. 17161, column e.

LORRAINE A. WEINBERGER, Primary Examiner

D. STENZEL, Assistant Examiner

U.S. Cl. X.R.

260—294, 471, 470, 473, 501.1, 501.16, 516, 518, 520, 521, 558, 559, 599; 424—308, 309, 317, 324